United States Patent [19]

Kawase et al.

[11] Patent Number: 4,856,490
[45] Date of Patent: Aug. 15, 1989

[54] WIRE SAW

[75] Inventors: Tsunezo Kawase; Shuichiro Koroku, both of Fujieda; Kunio Okada, Hiroshima, all of Japan

[73] Assignee: Osaka Diamond Industrial Co., Ltd., Sakai, Japan

[21] Appl. No.: 241,673

[22] Filed: Sep. 8, 1988

[30] Foreign Application Priority Data

Sep. 9, 1987 [JP] Japan .................................. 62-137749
Jul. 20, 1988 [JP] Japan .................................. 63-95802

[51] Int. Cl.⁴ .......................................... B26D 1/547
[52] U.S. Cl. .................................. 125/21; 125/18; 51/135 R; 51/357; 83/651.1
[58] Field of Search ................ 83/651.1, 661; 17/16, 17/46; 125/18, 12, 21, 22; 51/135 R, 357

[56] References Cited

U.S. PATENT DOCUMENTS

| | | | |
|---|---|---|---|
| 3,741,192 | 6/1973 | Avery | 125/21 |
| 3,847,569 | 11/1974 | Snow | 125/21 |
| 3,884,212 | 5/1975 | Armstrong et al. | 125/21 |
| 4,422,216 | 12/1983 | Spötzl | 83/651.1 |
| 4,674,474 | 6/1987 | Baril | 125/18 |
| 4,735,188 | 4/1988 | Kubo | 83/651.1 |

FOREIGN PATENT DOCUMENTS

| | | | |
|---|---|---|---|
| 1203000 | 1/1960 | France | 125/21 |
| 121817 | 6/1986 | Japan | 83/651.1 |
| 1057298 | 11/1983 | U.S.S.R. | 125/21 |
| 1217683 | 3/1986 | U.S.S.R. | 125/21 |

*Primary Examiner*—Frank T. Yost
*Assistant Examiner*—Scott A. Smith
*Attorney, Agent, or Firm*—Armstrong, Nikaido, Marmelstein, Kubovcik & Murray

[57] ABSTRACT

An improved wire saw having a wire rope, a resilient layer covering the outer periphery of the wire rope, and a plurality of sleeves mounted on the wire rope through the resilient layer at spacings, the sleeves having an abrasive layer on their outer periphery. The resilient layer has a smaller outer diameter at portions between the sleeves than over and adjacent to the sleeves. The sleeves or the resilient layer is provided with an engaging portion to axially extend to prevent one of them from turning with respect to the other.

7 Claims, 2 Drawing Sheets

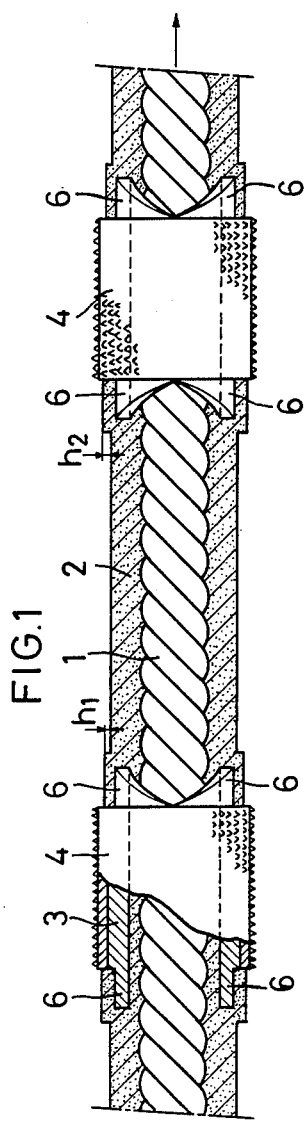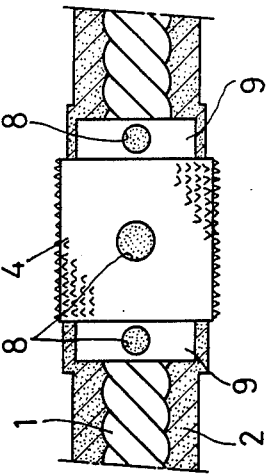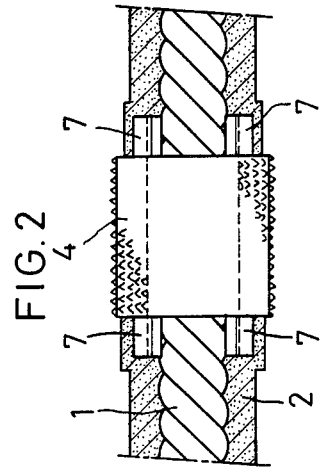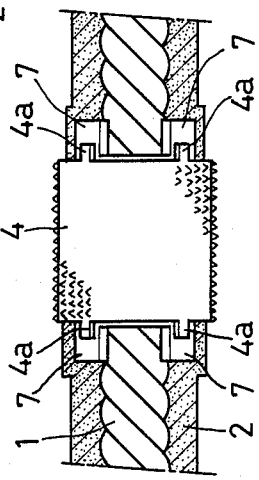

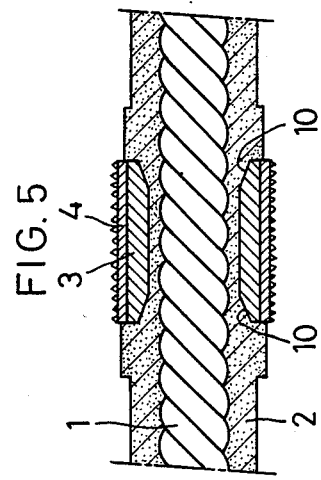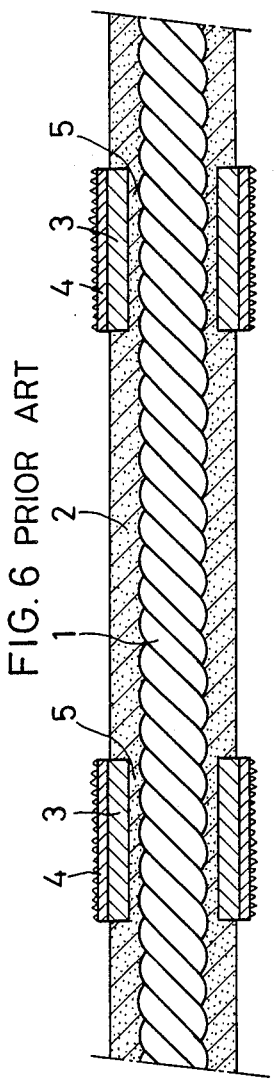

WIRE SAW

The present invention relates to improvements in a wire saw used to cut granite, marble, concrete or the like.

FIG. 6 shows a prior art wire saw which has a wire rope 1, a resilient layer 2, a plurality of sleeves 3 mounted on the wire through the resilient layer at spacings, and a hard abrasive layer 4 provided on the outer periphery of the sleeve 3 and made of diamond, cubic boron nitride (CBN) or the like. The resilient layer 2 usually covers the entire peripheral surface of the wire 1 and serves to bond the sleeve 3 to the wire, prevent the sleeve from turning with respect to the wire and displacing axially, and protect the wire from chips.

With such a prior art wire saw, since only the bonding force of the resilient layer is resorted to bond the sleeve to the resilient layer, bonding is not necessarily sufficient. During cutting, the sleeve can get free of the resilient layer and turn loosely. This might cause breakage of the wire due to abrasion between the sleeve and the wire. Poor bonding results from the fact that in the molding process, the resilient material will not flow smoothly into between the gap 5 between the sleeve and the wire. This results in uneven molding and thus uneven bonding force.

Another problem in the prior art wire saw is that the resilient layer, particularly its portions between the sleeves, is liable to get damaged due to contact with the material being cut and that the large contact resistance makes the cut dull and increases the torque required to run the wire.

An object of the present invention is to provide a wire saw which obviates the abovesaid shortcomings.

In accordance with the present invention, there is provided a wire saw comprising a wire rope, a resilient layer covering the outer periphery of the wire rope, a plurality of sleeves mounted on the wire rope through the resilient layer and spaced at distances, the sleeves having an abrasive layer on outer periphery thereof, the resilient layer having its outer diameter which is smaller at portions between each pair of the adjacent ones of the sleeves than over and adjacent to the sleeves, to form shoulders on the resilient layer at portions corresponding to both ends of each sleeve.

In accordance with the present invention, engaging portions are provided on one of the sleeve and the resilient layer so as to protrude toward the other. The engaging portions bite into the resilient layer or the sleeve, preventing the sleeve from turning loosely.

The arrangement insures that the sleeve is bonded securely to the resilient layer. This avoids breakage of the wire during cutting and ensures stable cutting for a prolonged period.

Other objects and features of the present invention will become apparent from the following description with c reference to the accompanying drawings in which:

FIGS. 1 to 3 are partially sectional side views of the first to third embodiments;

FIG. 4 is a sectional view of the fourth embodiment;

FIG. 5 is a partially sectional side view of the fifth embodiment; and

FIG. 6 is a sectional view of a prior art wire saw.

Firstly, referring to FIG. 1, an engaging portion 6 is provided on each end of the sleeve 3 so as to protrude axially into the resilient layer 2. The engaging portions 6 engage the resilient layer and serve to prevent the sleeve 3 from turning with respect to the resilient layer.

The wire rope 1 may be formed by twisting stainless steel wires with or without copper or zinc galvanized thereon. It should have an outer diameter of about 4.5 mm.

The sleeve 3 may be made of steel and should have its end portions copper plated to improve the bond with the resilient layer 2.

The resilient layer may be made of a resilient material such as natural rubber or synthetic resin. Preferably, it should be formed by covering the wire rope 1 with a mixture of natural rubber with carbon black and vulcanizing the mixture. An adhesive may be used for better bonding between the resilient layer and the wire rope and between the former and the sleeve.

In the embodiment of FIG. 2, the sleeve 3 is provided with an engaging portion 7 of a different shape.

In the embodiment of FIG. 3, the sleeve is substantially the same as in the embodiment of FIG. 2, but is formed with a plurality of holes 8 to receive the resilient material therein to form engaging portions.

In the embodiment of FIG. 4, the sleeve 3 is formed on its inner periphery at each end thereof with a tapered portion 10 having its inside diameter increasing toward the end of the sleeve 3. The tapered portions 10 allow the resilient material to smoothly flow into between the wire rope 1 and the sleeve 3 and form the resilient layer uniformly over the entire length of the sleeve 3.

The embodiment of FIG. 5 is substantially the same as the embodiment of FIG. 2, but the abrasive layer 4 is formed with a projection 4a protruding into the sleeve 3 to prevent the abrasive layer 4 from turning with respect to the sleeve 3. Coupled with the effect of the engaging portions 7, the projections 4a help to reduce the possibility of the abrasive layer 4 displacing with respect to the wire rope 1, thus ensuring a longer working life for the wire saw.

As a further feature of the present invention, in any of the embodiments, the resilient layer 2 has its outer diameter which is smaller at the portions between each pair of the adjacent sleeves 3 than over and adjacent to the sleeve to form a shoulder.

Preferably, the height h1 of the shoulder formed at the advancing end of the sleeve 3 in the direction of rotation a should be smaller than the height h2 of the shoulder formed at the trailing end of the sleeve.

The formation of the shoulders helps to reduce the possibility of undue contact of the resilient layer with the material being cut, thus avoiding the damage of the resilient layer. Also, it reduces the contact resistance and increases the running efficiency of the wire saw.

What is claimed is:

1. A wire saw comprising: a wire rope, a resilient layer covering the outer periphery of said wire rope, a plurality of sleeves mounted on said wire rope through said resilient layer and spaced at distances, said sleeves having an abrasive layer on outer periphery thereof, said resilient layer having its outer diameter which is smaller at portions between each pair of the adjacent ones of said sleeves than over and adjacent to said sleeves, to form shoulders on said resilient layer at portions corresponding to both ends of said each sleeve.

2. A wire saw as claimed in claim 1, wherein the shoulder formed at the advancing end of said each sleeve in the running direction of the wire saw has a smaller height than the shoulder formed at the trailing end of said sleeve.

3. A wire saw as claimed in claim 1, further comprising an engaging means extending axially to ensure, a secure bond between said sleeve and said resilient layer.

4. A wire saw as claimed in claim 1, wherein said sleeves each have said engaging portion at each end thereof so as to extend axially toward said resilient layer.

5. A wire saw as claimed in claim 1, wherein said sleeves are each formed with a hole to receive said resilient layer therein to form said engaging portion.

6. A wire saw as claimed in claim 1, wherein said sleeves have their inner periphery tapered at a portion adjacent to each end thereof.

7. A wire saw as claimed in claim 1, wherein said abrasive layer has a projection protruding into said sleeve to secure said abrasive layer to said sleeve.

* * * * *